US012803876B2

(12) United States Patent
Kumar et al.

(10) Patent No.: US 12,803,876 B2
(45) Date of Patent: *Nov. 17, 2026

(54) SYSTEMS AND METHODS FOR ORCHESTRATION OF NETWORK FUNCTIONS

(71) Applicant: Verizon Patent and Licensing Inc., Basking Ridge, NJ (US)

(72) Inventors: Abhishek Kumar, Irving, TX (US); Bharath Thiruveedula, Irving, TX (US); Myron Eugene Bagwell, Southlake, TX (US); Hans Raj Nahata, New Providence, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 127 days.

This patent is subject to a terminal disclaimer.

(21) Appl. No.: 18/975,225

(22) Filed: Dec. 10, 2024

(65) Prior Publication Data

US 2025/0106110 A1 Mar. 27, 2025

Related U.S. Application Data

(63) Continuation of application No. 18/175,594, filed on Feb. 28, 2023, now Pat. No. 12,199,825.

(51) Int. Cl.

*H04L 41/0895* (2022.01)
*H04L 41/0806* (2022.01)
*H04L 41/084* (2022.01)

(52) U.S. Cl.

CPC ...... *H04L 41/0895* (2022.05); *H04L 41/0806* (2013.01); *H04L 41/084* (2013.01)

(58) Field of Classification Search

CPC ............ H04L 41/0895; H04L 41/0806; H04L 41/084; H04L 41/0894; H04L 41/40; H04L 41/5041

See application file for complete search history.

(56) References Cited

U.S. PATENT DOCUMENTS 11,379,256 B1 7/2022 Agarwal
11,687,355 B1 * 6/2023 Mukherjee .......... H04L 41/0895 709/221
2022/0035650 A1 * 2/2022 Banerjee ............ G06F 9/45558
2022/0294691 A1 * 9/2022 Kumar Skand Priya .................... H04L 41/0895
2022/0353138 A1 11/2022 Wyszkowski
2023/0100276 A1 * 3/2023 Basur Shankarappa ..................... H04L 41/0895 718/1

(Continued)

*Primary Examiner* — Richard G Keehn

(57) ABSTRACT

A network function virtualization (NFV) orchestration service includes a centralized orchestration device and a multi-cluster container management (MCCM) platform. The centralized orchestration device stores a catalog of virtual network function descriptors (VNFDs) in an input language; generates, based on the catalog of VNFDs, intents for containerized network function (CNF) services; and stores the generated intents as blocks in a central intent database, wherein the blocks include an input data model for the CNF services. The MCCM platform includes one or more processors to receive and store a copy of the intent database; read design time policies from the copy of the intent database; and convert the input data model into a vendor-specific output data model in an output language.

20 Claims, 10 Drawing Sheets

(56) References Cited

U.S. PATENT DOCUMENTS

| | | | |
|---|---|---|---|
| 2024/0285726 A1 | 8/2024 | Gabant | |
| 2025/0293933 A1* | 9/2025 | Li | H04L 41/0895 |

* cited by examiner

SYSTEMS AND METHODS FOR ORCHESTRATION OF NETWORK FUNCTIONS

CROSS REFERENCE TO RELATED APPLICATION

This application is a continuation of U.S. patent application Ser. No. 18/175,594, filed on Feb. 28, 2023, and titled "Systems and Methods for Orchestration of Network Functions," the contents of which are incorporated herein by reference.

BACKGROUND

Service providers and operators are looking for ways to deliver digital transformation for their customers via an on demand end-to-end network service creation and fulfillment platform. For example, software-defined networking and/or network function virtualization may allow network functions of a wireless telecommunications network to execute from reconfigurable resources of function-agnostic hardware. Function-agnostic hardware may be offered by service providers in different platforms, such as a Containers as a Service (CaaS) platform.

DETAILED DESCRIPTION

Figure 1:
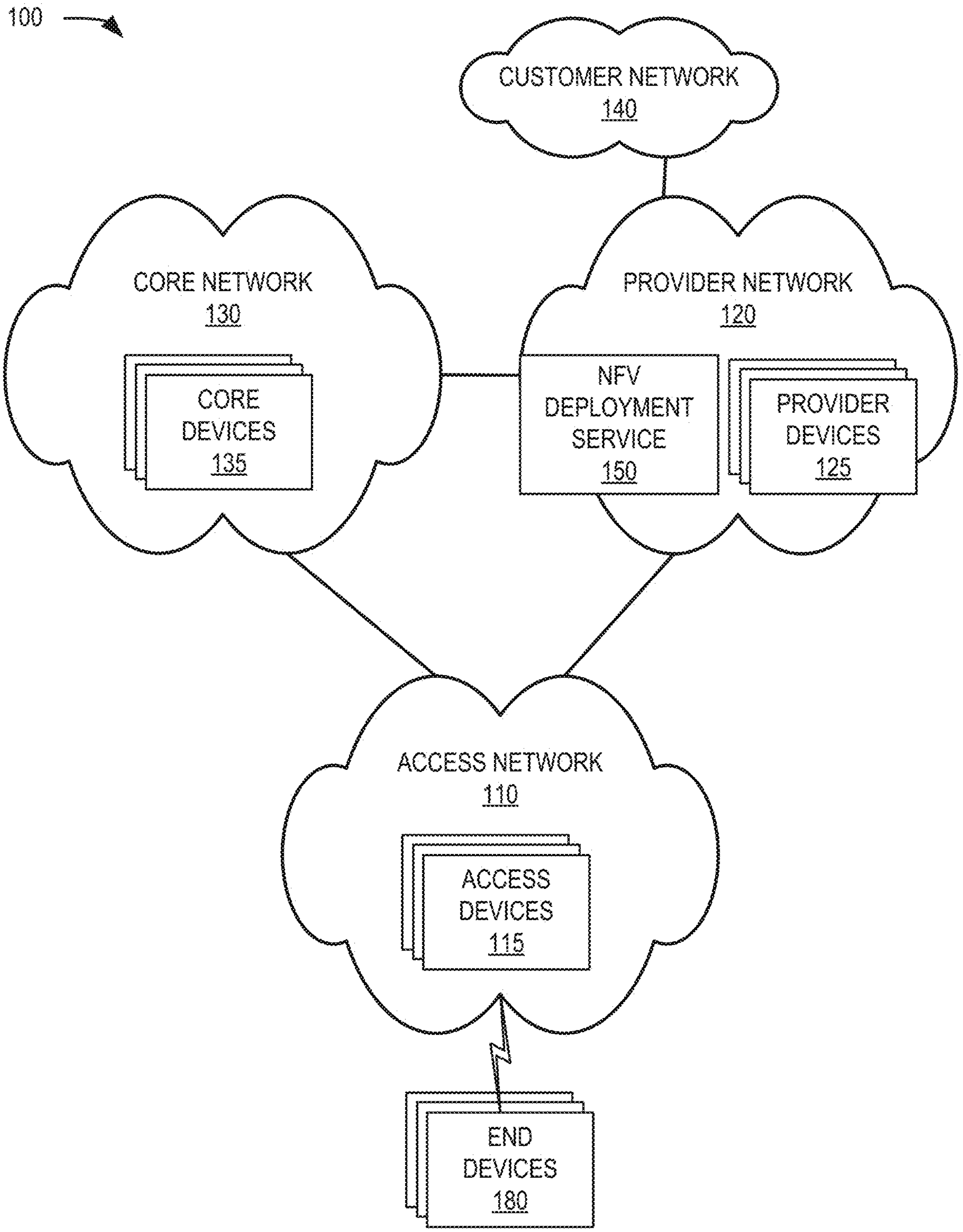
FIG. 1 is a diagram illustrating an example environment in which an exemplary embodiment of a network function virtualization (NFV) deployment service may be implemented.

The following detailed description refers to the accompanying drawings. The same reference numbers in different drawings may identify the same or similar elements. Also, the following detailed description does not limit the invention.

A mobile network operator (MNO) or service provider may be responsible for maintaining network infrastructure, such as a networking core (e.g., Fifth Generation (5G) core), edges, and radio access network (RAN), which may be implemented using various network functions (NFs). The NFs may be implemented as software applications defined herein as containers. Containers may be similar to virtual machines (VMs), but can have relaxed isolation properties to share the operating system (OS) among the applications. In contrast to a VM, a container may emulate an operating system, rather than hardware.

The ability to optimize 5G network management and service delivery is of paramount importance to MNOs and relies on a private network deployment model. The private networks deployment model involves the orchestration and automation of the entire suite of 5G core, edge, and radio access network (RAN) functions in enterprise locations outside the jurisdiction of the operator's network cloud. These private networks may also require intervention in real-time for scaling/healing due to stringent service level agreement (SLA) requirements.

When a vendor containerized network function (CNF) package is deployed, the deployment usually needs to be adapted to the vendor software and also adapted with the common services that a service provider's Containers as a Service (CaaS) platform offers. However, it can be burdensome for a service provider to update the vendor code for each software release from the vendor. Particularly, the classical model of cloud orchestration is centralized. One central orchestrator remotely manages all the cloud sites and resources. The central orchestrator holds the complete and total intent (to be described below) of network services along with network functions and network topology; and is in charge of topology reconciliation, inventory management (e.g., data collection), and topology management (e.g., reconciliation). The larger the network; the larger the orchestrator becomes and so does the challenge to manage the scalability and reliability of the network services running on enterprise networks and/or on devices at the far edge locations (closer in proximity to the end-users).

Furthermore, current orchestration systems use an imperative workflow, which requires detailed user input to configure. An intent-based orchestration framework would simplify user input, reduce configuration errors, and streamline the orchestration process.

Systems and methods described herein relate to the lifecycle management of containerized network functions. A multi-cluster container management (MCCM) framework is introduced in a network function virtualization management and orchestration architectural framework (NFV-MANO) to mediate the intent translation process and represent the NFV resources in the cloud platform. The systems and methods may standardize the inputs, to the MCCM framework, that can be used for generating the intents. The MCCM framework may take application descriptors and cloud descriptors as input, transform them into intents, and generate custom resource definitions (CRDs) and/or custom resources (CR). The systems and methods may also generate specialized intents to manage platform automation, network automation, and application lifecycle management operations.

As used herein, intents (also referred to as "user intents") may indicate what a user or customer wants to do, or an expression that indicates an expected final state or service state to be maintained. According to an implementation, a NFV deployment service includes a centralized orchestration device and MCCM platform. The centralized orchestration device stores a catalog of virtual network function descriptors (VNFDs) in an input language; generates, based on the catalog of VNFDs, intents for CNF services; and stores the generated intents as blocks in a central intent database, wherein the blocks include an input data model for the CNF services. The MCCM platform includes one or more processors to receive and store a copy of the intent database; read design time policies from the copy of the intent database; and convert the input data model into a vendor-specific output data model in an output language.

FIG. 1 is a diagram of an exemplary environment 100 in which systems and/or methods, described herein, may be implemented. As illustrated, environment 100 includes access network 110, a provider network 120, a core network 130, and a customer network 140. Access network 110 includes access devices 115 (also referred to individually or generally as access device 115). Provider network 120 includes provider devices 125 (also referred to individually or generally as provider device 125). Core network 130 includes core devices 135 (also referred to individually or generally as core device 135). Environment 100 further includes an NFV deployment service 150 and end devices 180 (also referred to individually or generally as end device 180).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network, or another type of network that may support a wireless service and/or an application service, as described herein.

The number, the type, and the arrangement of network devices, and the number of end devices 180 are exemplary. A network device may be implemented according to one or multiple architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 180 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communication connection may not involve an intermediary device and/or an intermediary network. The number, type, and arrangement of communication links illustrated in environment 100 are exemplary. Environment 100 may also include various planes of communication including, for example, a control plane, a user plane, a service plane, and/or a network management plane. Environment 100 may include other types of planes of communication.

Access network 110 may include one or multiple networks of one or multiple types and technologies. For example, access network 110 may be implemented to include a 5G-access network (5G-AN) or a 5G-radio access network (RAN), a future generation RAN (e.g., a 6G RAN or subsequent generation RAN). Access network 110 may also include a legacy RAN (e.g., a Third Generation (3G) RAN, a 4G or 4.5 RAN, etc.). Access network 110 may communicate with and/or include other types of access networks, such as, for example, a WI-FI network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to access network 110, provider network 120, and/or core network 130.

Depending on the implementation, access network 110 may include one or multiple types of network devices, such as access devices 115. For example, access device 115 may include a next generation Node B (gNB), an evolved Node B (eNB), an evolved Long Term Evolution (eLTE) eNB, a radio network controller (RNC), a remote radio head (RRH), a baseband unit (BBU), a radio unit (RU), a centralized Unit (CU), a CU control plane (CU CP), a CU user plane (CU UP), a distributed unit (DU), a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB)), 5G ultra-wide band (UWB) nodes, a future generation wireless access device (e.g., a 6G wireless station, etc.), another type of wireless node (e.g., a WI-FI device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 115 may include a wired and/or optical device (e.g., modem, wired access point, optical access point, Ethernet device, etc.) that provides network access.

Provider network 120 may include one or multiple networks of one or multiple types and technologies. For example, provider network 120 may be implemented to include a service or an application-layer network, a cloud network, a private network, a public network, a multi-access edge computing (MEC) network, a fog network, the Internet, a service provider network, an Internet Protocol Multimedia Subsystem (IMS) network, a Rich Communication Service (RCS) network, software defined network (SDN), a virtual network, a packet-switched network, a data center, or other type of network that may provide access to and may host an end device application, service, or asset (also referred to as an "application service"). According to an exemplary embodiment, provider network 120 may include NFV deployment service 150, as described herein.

Depending on the implementation, provider network 120 may include various network devices such as provider devices 125. For example, provider devices 125 may include servers (e.g., web, application, cloud, etc.), mass storage devices, data center devices, network function virtualization (NFV) devices, containers, virtual machines, SDN devices, cloud computing devices, platforms, and other types of network devices, and/or platforms implemented or arranged in accordance with architectures pertaining to various network-related functions (e.g., security, management, charging, billing, authentication, authorization, policy enforcement, development, etc.). In one implementation, provider devices 125 may operate NFV deployment service 150.

Core network 130 may include one or multiple networks of one or multiple network types and technologies. For example, core network 130 may be implemented to include a Next Generation Core (NGC or 5GC) network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network. According to an embodiment, core network 130 may include some or all of NFV deployment service 150, as described herein.

Depending on the implementation, core network 130 may include various types of network devices that are illustrated in FIG. 1 as core devices 135. For example, core devices 135 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network data analytics function (NWDAF), an application function (AF), a mobility management entity (MME), and a packet gateway (PGW). According to other exemplary implementations, core devices 135 may include additional, different, and/or fewer network devices than those described.

Customer network 140 may include a wide area network (WAN), a Layer 2 and/or Layer 3 LAN, an enterprise network, or a combination of networks associated with a customer of provider network 120. Customer network 140 may include a network that receives services from provider network 110. Customer network 140 may include a local area network (LAN), a WAN, or a combination of networks that provide network access to devices in provider network 120. In one implementation, customer network 140 may include a network interconnecting one or more physical network functions (PNF), VNFs, and/or CNFs.

NFV deployment service 150 may provide an intent-based system for CNF orchestration that is compatible with an NFV MANO architecture, for example. As described further herein, NFV deployment service 150 may provide a framework to standardize the inputs that can be used for generating the intents. NFV deployment service 150 may accept service descriptors as input, transform the descriptors into intents, and generate vendor specific models. For example, NFV deployment service 150 may receive as input network service descriptors (NSDs) and/or VNFDs in Topology and Orchestration Specification for Cloud Applications (TOSCA) format and generate as output CRDs and/or CRs in YAML ("Yet Another Mark-up Language") format to deploy or modify Kubernetes-based cloud resources.

End devices 180 include a device that may have computational and/or communication capabilities (e.g., wireless, wired, optical, etc.). End device 180 may be implemented as a mobile device, a portable device, a stationary device (e.g., a non-mobile device), a device operated by a user, or a device not operated by a user. For example, end device 180 may be implemented as a smartphone, a mobile phone, a personal digital assistant, a tablet, a netbook, a wearable device (e.g., a watch, glasses, etc.), a computer, a gaming device, a music device, an Internet of Things (IoT) device, a drone, a smart device, or other type of wireless device (e.g., other type of user equipment (UE)). End device 180 may be configured to execute various types of software (e.g., applications, programs, etc.). The number and the types of software may vary among end devices 180.

Figure 2:
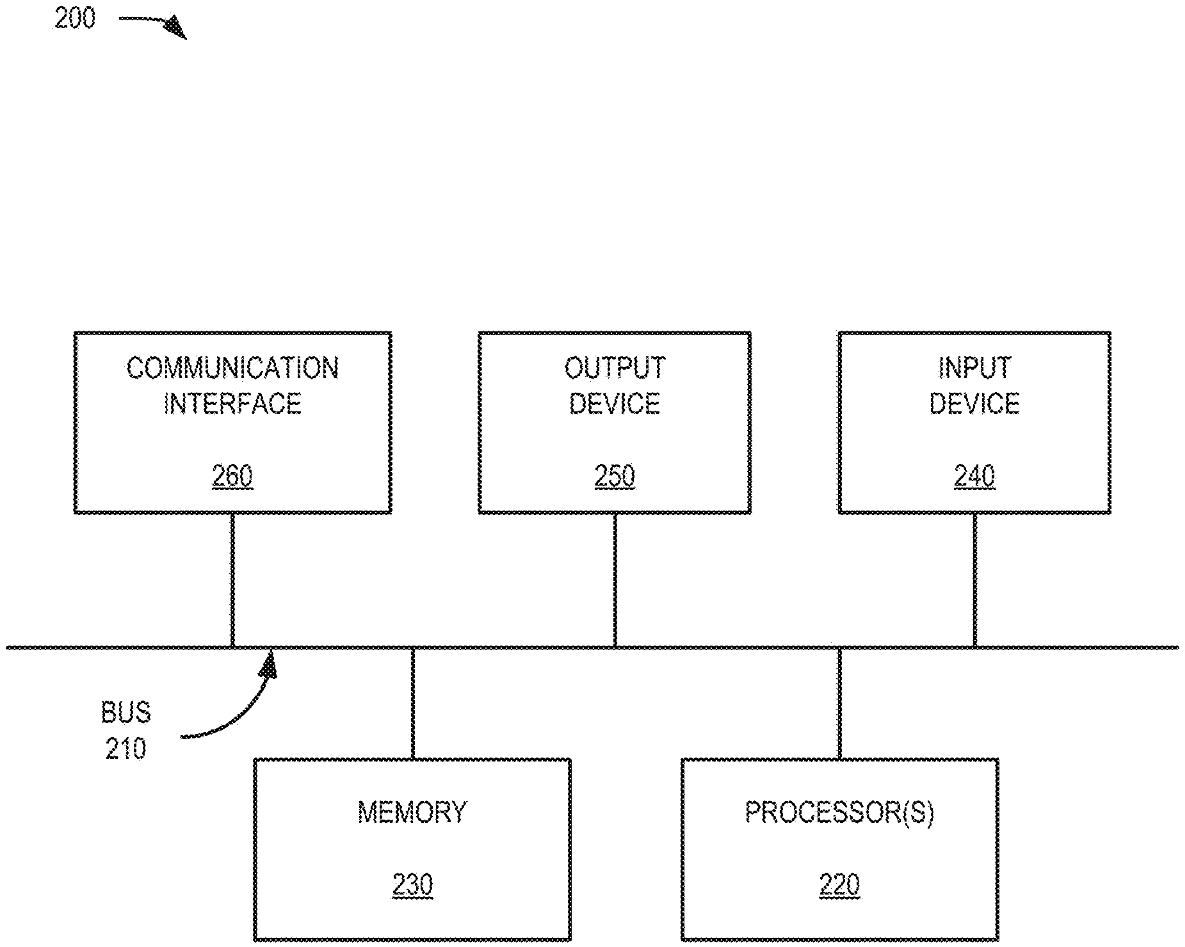
FIG. 2 is a diagram illustrating example components of a device that may correspond to one or more of the devices illustrated herein.

FIG. 2 is a diagram illustrating exemplary components of a device 200 that may correspond to one or more of the network devices described herein. For example, device 200 may correspond to components included in access network 110, provider network 120, core network 130, customer network 140, NFV deployment service 150, and/or other elements illustrated in FIGS. 3-9. Various network functions of networks 110, 120, 130, and/or 140 may be implemented by a network device that includes one or more components that are the same as, or similar to, those of device 200. As illustrated in FIG. 2, according to an exemplary embodiment, device 200 may include a bus 210, a processor 220, a memory 230, an input device(s) 240, an output device(s) 250, and a communication interface(s) 260.

Bus 210 may include a path that permits communication among the components of device 200. Processor 220 may include one or more processors or microprocessors which may interpret and execute instructions, or processing logic. Memory 230 may include one or more memory devices for storing data and instructions. Memory 230 may include a random access memory (RAM) or another type of dynamic storage device that may store information and instructions for execution by processor 220, a Read Only Memory (ROM) device or another type of static storage device that may store static information and instructions for use by processor 220, and/or a magnetic, optical, or flash memory recording and storage medium. The memory devices of memory 230 may each be referred to herein as a "tangible non-transitory computer-readable medium," "non-transitory computer-readable medium," or "non-transitory storage medium." In some implementations, the blocks of the processes/methods set forth herein can be implemented as instructions that are stored in memory 230 for execution by processor 220.

Input device 240 may include one or more mechanisms that permit an operator to input information into device 200, such as, for example, a keypad or a keyboard, a display with a touch sensitive panel, voice recognition and/or biometric mechanisms, etc. Output device 250 may include one or more mechanisms that output information to the operator, including a display, a speaker, etc. Input device 240 and output device 250 may, in some implementations, be implemented as a user interface (UI) (e.g., a graphical UI) that displays UI information and which receives user input via the UI.

Communication interface 260 may include a transceiver (s) that enables device 200 to communicate with other devices and/or systems. For example, communication interface 260 may include one or more wired and/or wireless transceivers for communicating via access network 110. In the case of access devices 115 configured as eNBs/gNBs of access network 110, communication interface 260 may further include one or more antenna arrays for transmitting or receiving radio frequency (RF) in cells or cell sectors for end device 180 access.

The configuration of components of network device 200 shown in FIG. 2 is for illustrative purposes. Other configurations may be implemented. Therefore, network device 200 may include additional, fewer and/or different components, arranged in a different configuration, than depicted in FIG. 2. For example, an Internet of Things (IoT) end device 180 may include similar components to those shown in FIG. 2, but may omit input device 240 and/or output device 250.

Figure 3:
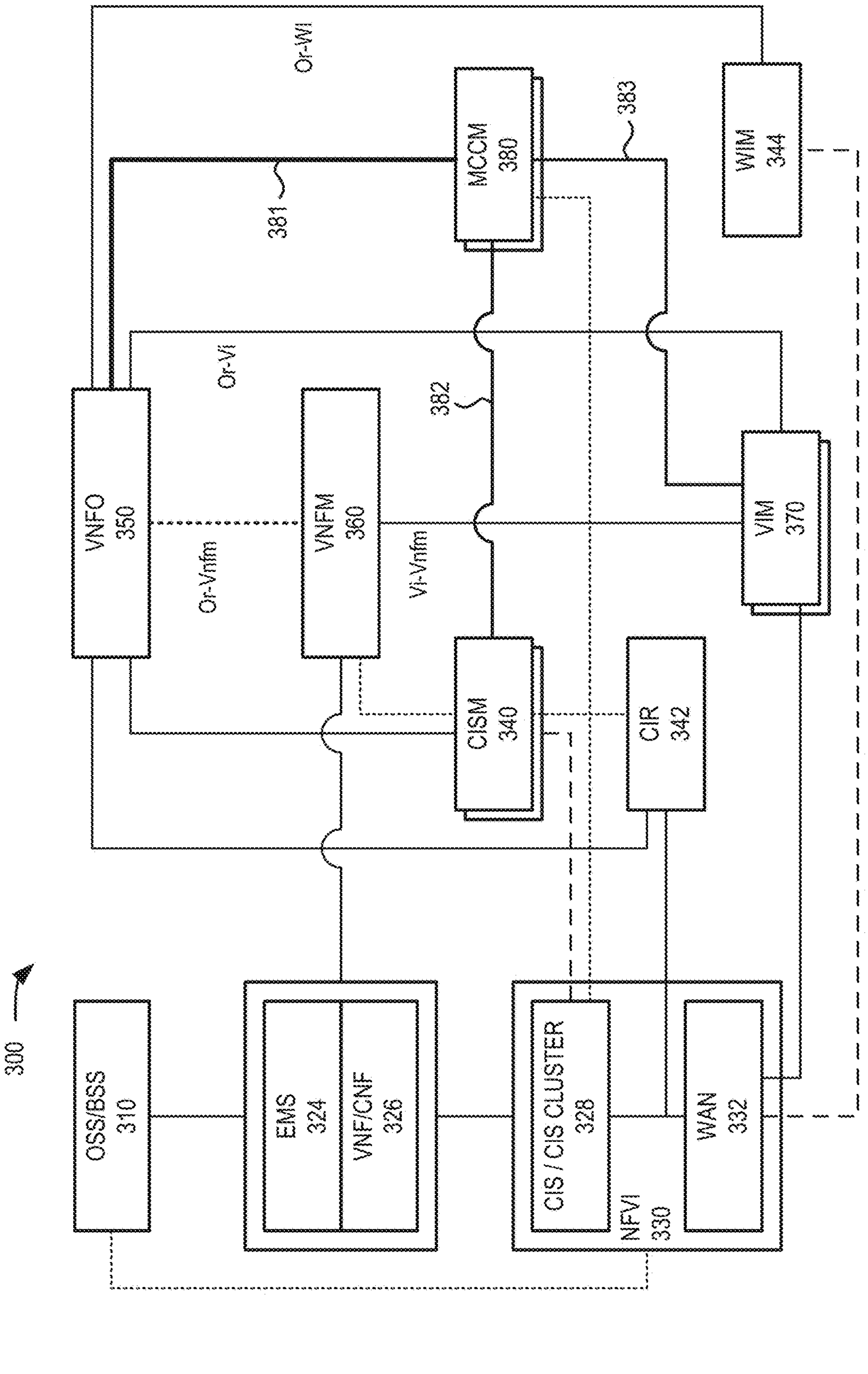
FIG. 3 is a diagram illustrating the NFV deployment service within a NFV management and orchestration (MANO) architectural framework, according to an implementation.

FIG. 3 is a diagram illustrating NFV deployment service 150 within an NFV architecture system 300 for CNF orchestration, according to an implementation. NFV architecture system 300 may be distributed within one or multiple networks of environment 100. The functional components of NFV architecture system 300 may be implemented, for example, via processor 220 executing instructions from memory 230. NFV architecture system 300 may correspond to, for example, a modified European Telecommunications Standards Institute (ETSI) NFV MANO architecture.

As shown in FIG. 3, NFV architecture system 300 may include an operations support system (OSS)/business support system (BSS) 310, an element management system (EMS) 324, VNFs/CNFs 326, an NFV Infrastructure (NFVI) 330 including a Container Infrastructure Service (CIS)/CIS cluster 328 and a WAN 332, a Container Infrastructure Service Manager (CISM) 340, a Container Image Registry (CIR) 342, a WAN Infrastructure Manager (WIM) 344, a VNF orchestrator (VNFO) 350, a VNF manager (VNFM) 360, a virtualization infrastructure manager (VIM) 370, and a multi-cluster container manager (MCCM) 380.

OSS/BSS 310 may include an OSS and/or BSS. The OSS may include a network monitoring system, a network provisioning system, a network management system, a self-optimizing network (SON) system, etc. The BSS may include an ordering system, a customer service system, and/or a billing system. OSS/BSS 310 may manage the physical components of access network 110, core network 120, provider network 130, and/or customer network 140.

EMS 324 and VNF/CNF 326 may each include a VNF managed object (MO). Each EMS 324 may manage a PNF. A VNF/CNF 326 may include the implementation of network functions. For example, if NFV architecture system 300 is used for a wireless access network (e.g., access network 110), a first VNF/CNF 326 may correspond to a virtualized eNodeB, a second VNF/CNF 326 may correspond to a virtualized MME, a third VNF/CNF 326 may correspond to a virtualized SGW, a fourth VNF/CNF 326 may correspond to a virtualized PGW, a fifth VNF/CNF 326 may correspond to an HSS, etc.

NFVI 330 may include hardware (e.g., processors, memory, storage components, networking components, etc.) and software components on which VNFs/CNFs 326 are deployed. For example, NFVI 330 may include the hardware and software components included in one or more cloud center devices (e.g., one of provider devices 125 or core devices 135) to support Container Infrastructure Services (CIS)/CIS cluster 328 and WAN 332. CIS/CIS cluster 328 may include network functions that defines the stages of the software lifecycle from initial release through retirement. WAN 332 may include a network where the VNFs are implemented. CISM 340 may manage VNF managed objects. For example, CISM 340 may configure virtualized components, hardware, and/or underlying network components to support CaaS requests. According to implementations described herein, CISM 340 may receive CRDs and/or CRs from MCCM 380. CISM 340 may communicate with MCCM 380 via a new interface 382.

CIR 342 may provide container image management services. WIM 344 may interface with NFVO 350 to implement WAN infrastructure changes.

VNFO 350 may perform orchestration of NFV to ensure that sufficient resources are available to provide a network service and that a particular network function is deployed, changed, or removed. Thus, end-to-end orchestration module 350 may coordinate requests received via OSS/BSS interface 310 with VNFM 360 and VIM 370. According to implementations described herein, VNFO 350 may include components to generate intents and populate a central (or centralized) intent database that is replicated to MCCM 380. According to implementations described herein VNFO 350 may communicate with MCCM 380 via a new interface 381.

VNFM 360 may manage VNFs/CNFs 326. VNFM 360 may perform lifecycle management of particular VNFs/CNFs 326, including instantiation, scaling, updating, and/or termination of particular VNFs/CNFs 326 based on instructions received from VNFO 350.

VIM 370 may manage NFVI 330. For example, VIM 370 may maintain a mapping of CIS/CIS cluster 328 to physical resources and may orchestrate the allocation, updating, and/or release of NFVI resources. According to implementations described herein, VIM 370 may receive CRDs and/or CRs from MCCM 380. VIM 370 may communicate with MCCM 380 via a new interface 383.

MCCM 380 may include a network function to mediate the intent translation process and represent the NFV resources in the cloud platform. MCCM 380 may receive standardized inputs (e.g., from NFVO 350 via interface 381) that can be used for generating the intents. MCCM 380 may receive, for example, application and cloud descriptors as input, transform the input into intents, and generate deployment models, such as custom resource definitions (CRDs) and custom resources (CRs). MCCM 380 may generate specialized intents to manage the platform automation, network automation, and application lifecycle management operations. According to an implementation, MCCM 380 may provide deployment models to CISM 340 (e.g., via interface 382) and VIM 370 (e.g., via interface 382). MCCM 380 is described further below in connection with FIG. 6, for example.

Although FIG. 3 shows exemplary components of NFV architecture system 300, in other implementations, NFV architecture system 300 may include fewer components, different components, additional components, or differently arranged components than depicted in FIG. 3. Additionally or alternatively, one or more components of NFV architecture system 300 may perform one or more tasks described as being performed by one or more other components of NFV architecture system 300.

Figure 4:
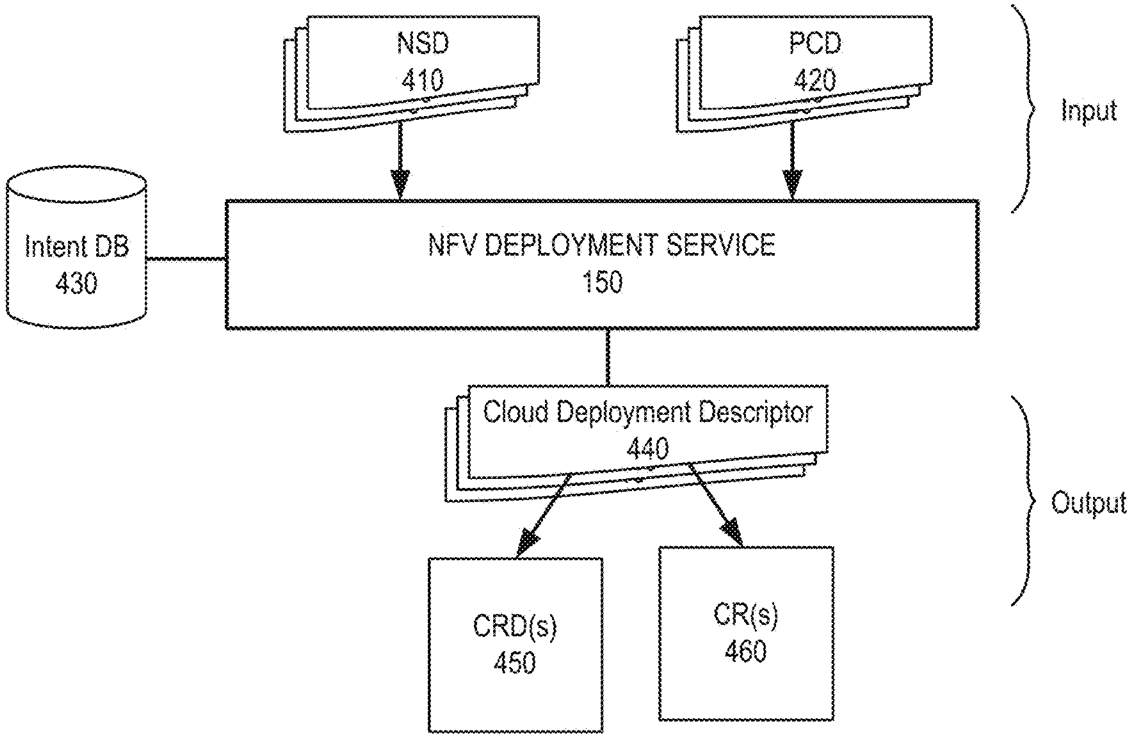
FIG. 4 is a diagram illustrating simplified processing and communications of the NFV deployment service, according to an implementation.
Figure 5:
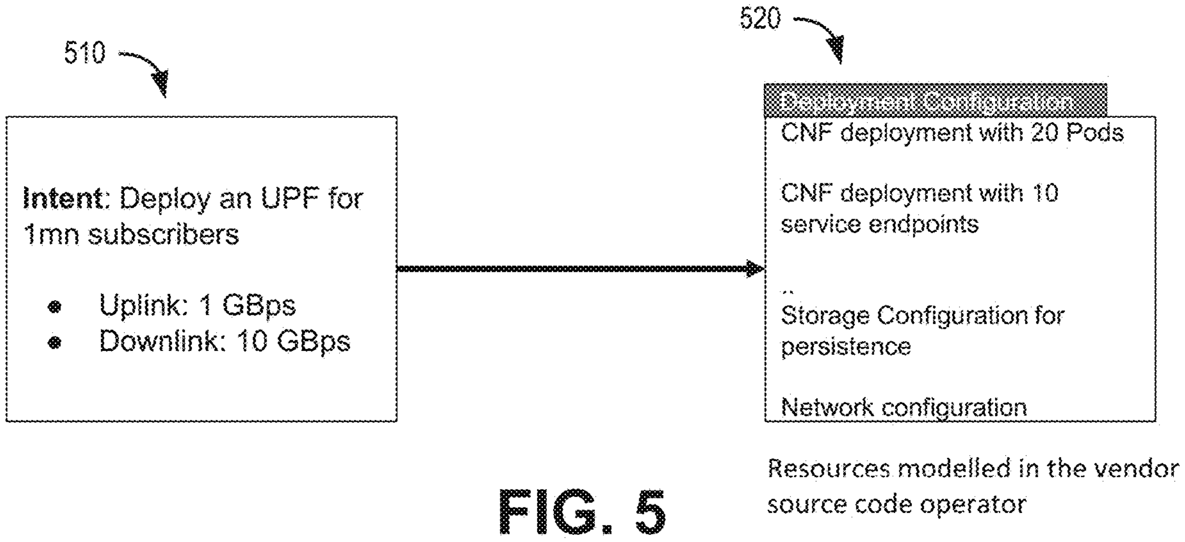
FIG. 5 is a diagram illustrating an intent that may be determined by the NFV deployment service.

FIGS. 4 and 5 are diagrams illustrating concepts described herein. FIG. 4 illustrates simplified processing and communications of NFV deployment service 150, according to an implementation. NFV deployment service 150 may include portions of VNFO 350 and MCCM 380. NFV deployment service 150 may perform service descriptor to cloud descriptor translation. NFV deployment service 150 may receive as input network service descriptors (NSDs) 410 and platform configuration descriptors (PCDs) 420. For example, NFV deployment service 150 may receive onboarding input from an OSS/BSS 310. VNFO 350 and MCCM 380 may convert the input into intents.

According to an implementation, MCCM 380 may include an intent generator that generates and stores events as blocks in an intent database 430. FIG. 5 illustrates an example intent 510 that may be determined by MCCM 380. Intent 510 may be one of a group of intents for a customer's desired state/service. As shown in FIG. 5, intent 510 may include deploying a UPF for one million subscribers with an uplink speed of 1 gigabytes per seconds (Gbps) and a downlink speed of 10 Gbps.

MCCM 380 may generate cloud deployment descriptors 440 to implement detected intents. For example, in response to the determined intent in FIG. 5 (e.g., intent 510), MCCM 380 may determine a deployment configuration 520 that includes CNF deployment with 20 pods (e.g., a group of containers), 10 service endpoints, a required storage configuration, and a network configuration. Deployment configuration 520 may be included in cloud deployment descriptors 440 and implemented via CRD 450 and/or CR 460. CRD 450 and CR 460 may be configured as YAML files for CNFs. As described further herein, the generated blocks of intent may be processed by specific sensors in an MCCM 380 and, at runtime, the MCCM 380 may send triggers with site-specific artifacts to the appropriate actuators for the execution of the intent blocks. Site specific artifacts may include, for example, a YAML file for the CNFs and other files such as netconf/YANG configurations or cloud-initialization files which should be applied to a NF.

Figure 6:
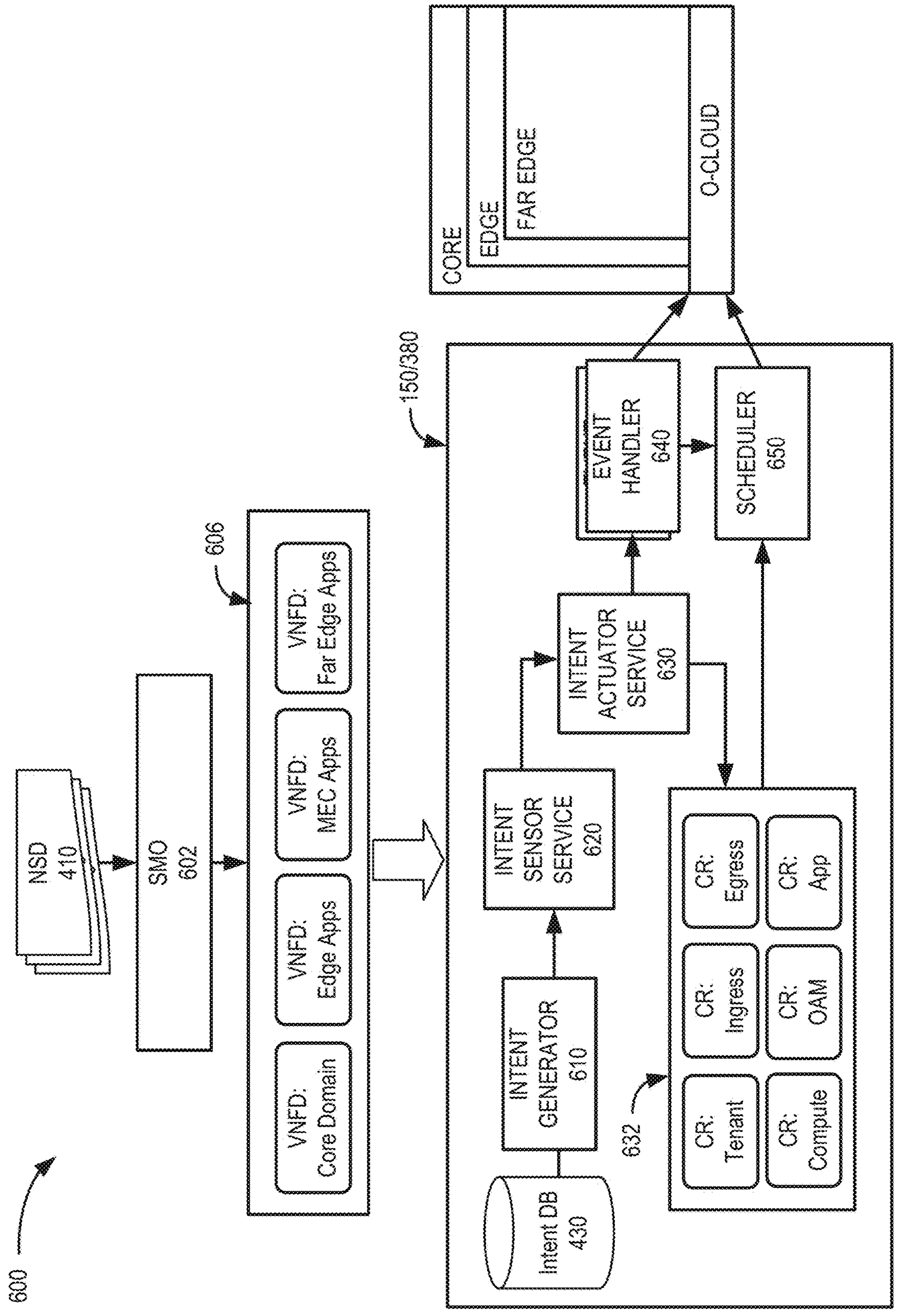
FIG. 6 is a diagram illustrating functions of the NFV deployment service within another architecture, according to another implementation.

FIG. 6 is a diagram illustrating functions of MCCM 380 within a Nephio Reference Architecture, according to another implementation. As shown in FIG. 6, Service Management and Orchestration (SMO 602) may receive an NSD 410 for a customer order, such as an upgrade, lifecycle management change, scaling operation, configuration management request, etc. NSD 410 may be provided, for example, as a TOSCA file. SMO 602 may decompose the NSD into individual network functions, and generate corresponding descriptors (e.g., VNFDs) to model the individual network functions. For example, as shown in FIG. 6, SMO 602 may generate VNFDs 606 for core network, edge applications, MEC applications (e.g., applications that run on a MEC network), far edge applications, etc. According to an implementation, VNFDs 606 may also be provided in TOSCA files. In the various VNFDs 606, SMO 602 may identify necessary topology for compute resources, storage resources, network resources, application specific resources, etc.

The various VNFDs 606 may be forwarded to and received by MCCM 380. Using intent DB 430, an intent generator 610 of MCCM 380 may generate intents for the different VNFDs. For example, intent generator 610 may parse the VNFDs 606 and identify the keywords corresponding to compute, storage and network resources.

Figure 7:
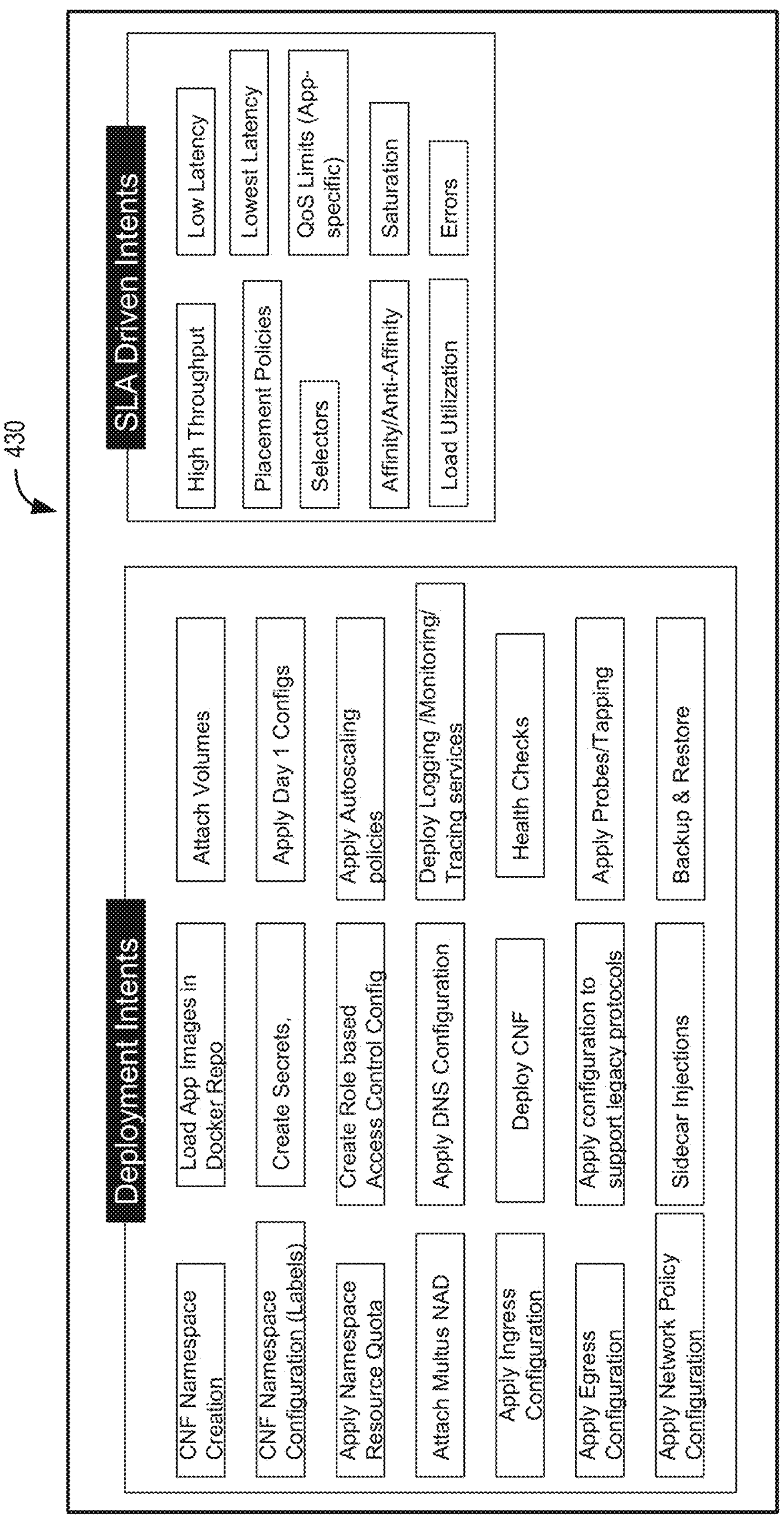
FIG. 7 illustrates examples of high level intents that may be included in an intent database, according to an implementation.

FIG. 7 illustrates examples of high level intents that may be included in intent DB 430. Intent DB 430 may include high-level intents, such as different deployment intents and different service level agreement (SLA) intents. Each intent in DB 430 may be associated with compute resources, storage resources, network resources, application specific resources, etc. that are necessary a NF to support an intent.

Referring to FIG. 6, the generated blocks of intent may be processed by an intent sensor service 620. Intent sensor service 620 may realize/detect what types of intents are being provided from SMO 602. Intent sensor service 620 includes an intent sensor for each intent type (e.g., each high-level intent from intent DB 430). For example, intent sensor service 620 may include a different sensor for each intent shown in FIG. 7, such as "CNF Namespace Creation.," "CNF Namespace Configuration.(Labels)," "Apply Namespace Resource Quota," etc. Some intents may be for design time and other intents may be for runtime execution.

Intent sensor service 620 may send a trigger to intent actuator service 630 for the execution of the intent blocks. More particularly, an intent sensor may send a trigger to a specific intent actuator to implement an intent. That is, for a given intent, an intent sensor may identify the correct intent actuator to take the necessary actions to generate a vendor-specific output data model. As an example, an intent sensor may determine that certain labels are needed for an instantiation request with certain policies and identify an intent actuator associated with providing the labels.

The intent actuators of intent actuator service 630 may actualize the intents. For example, the intent actuators (for design time intents) may be responsible for converting the VNFD 606 data models from an input form (e.g., TOSCA) to an output CR (e.g., YAML) file (e.g., CRs 632) and deploying CNF operators in the cluster namespace. The intent actuators may select and communicate with one or more event handlers 640 to perform an intent. Additionally, or alternatively, a scheduler/workflow engine 650 may coordinate with event handler 640 to provide appropriate CRDs/CRs to cloud resources in one or more of networks 110, 130, and 140.

Figure 8:
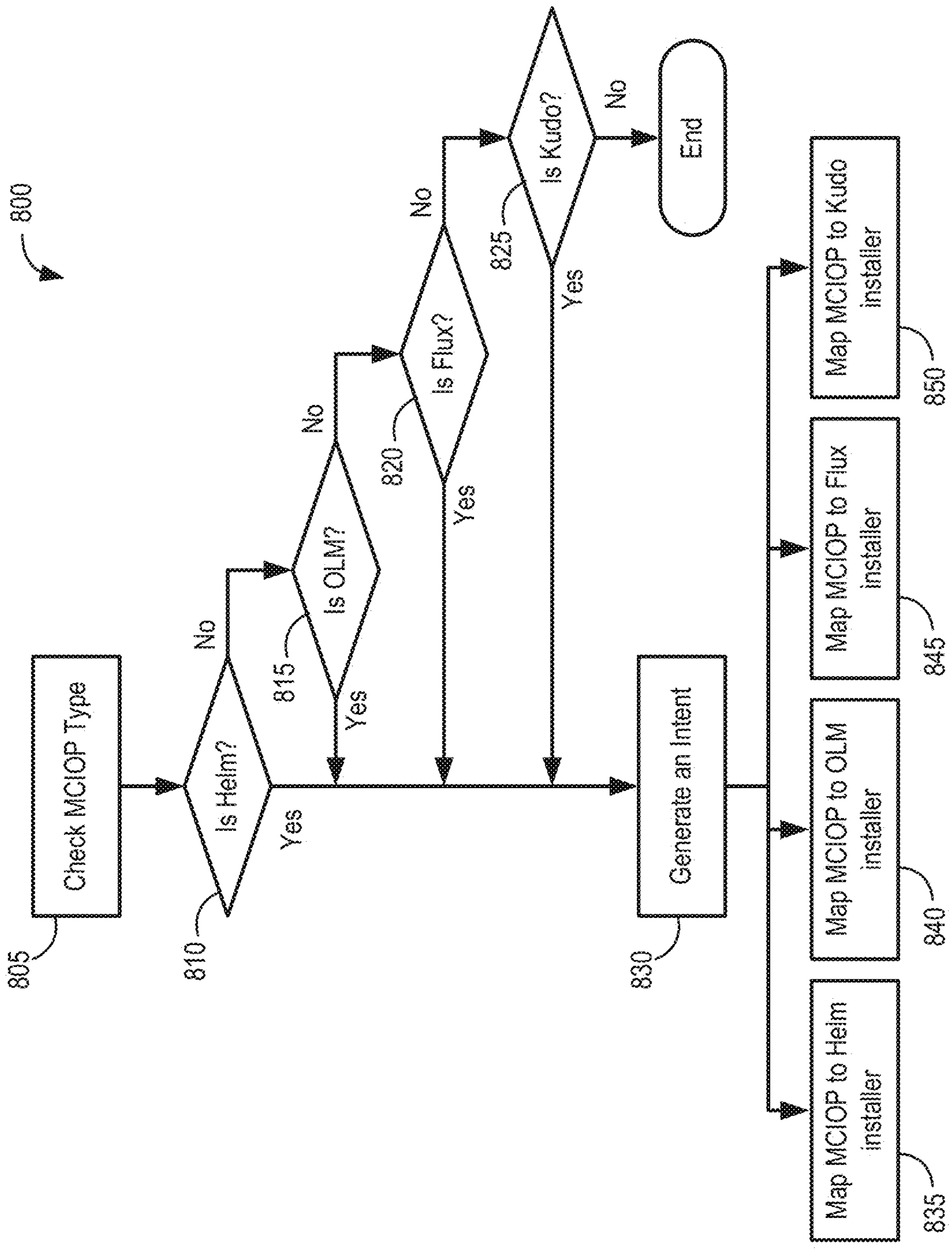
FIG. 8 is an example selection decision flow for one type of intent, according to an implementation.

The logic/process for selecting an event handler 640 may be different for different types of intents. FIG. 8 provides an example selection decision flow 800 for selecting one type of intent, particularly, selecting an operator binary type for deploying a CNF.

As shown in FIG. 8, an intent actuator of intent actuator service 630 may need to determine a particular type of deployment strategy for a Managed Container Infrastructure Object Platform (MCIOP) (block 805). The intent actuator may check the CR file to determine if the MCIOP type is a Helm chart (block 810), and then an operator lifecycle manager (OLM) tool (block 815), and then Flux (block 820), and then Kudo (block 825). If any of the above are detected, the intent actuator may generate an intent to be used by the appropriate event handler 640. The intent actuator may map the event type to the appropriate installer. If the MCIOP type is a Helm, the intent actuator may map the MCIOP to a Helm installer (block 835). If the MCIOP type is an OLM, the intent actuator may map the MCIOP to an OLM installer (block 840). If the MCIOP type is Flux, the intent actuator may map the MCIOP to a Flux installer (block 840). If the MCIOP type is Kudo, the intent actuator may map the MCIOP to a Kudo installer (block 845).

Figure 9:
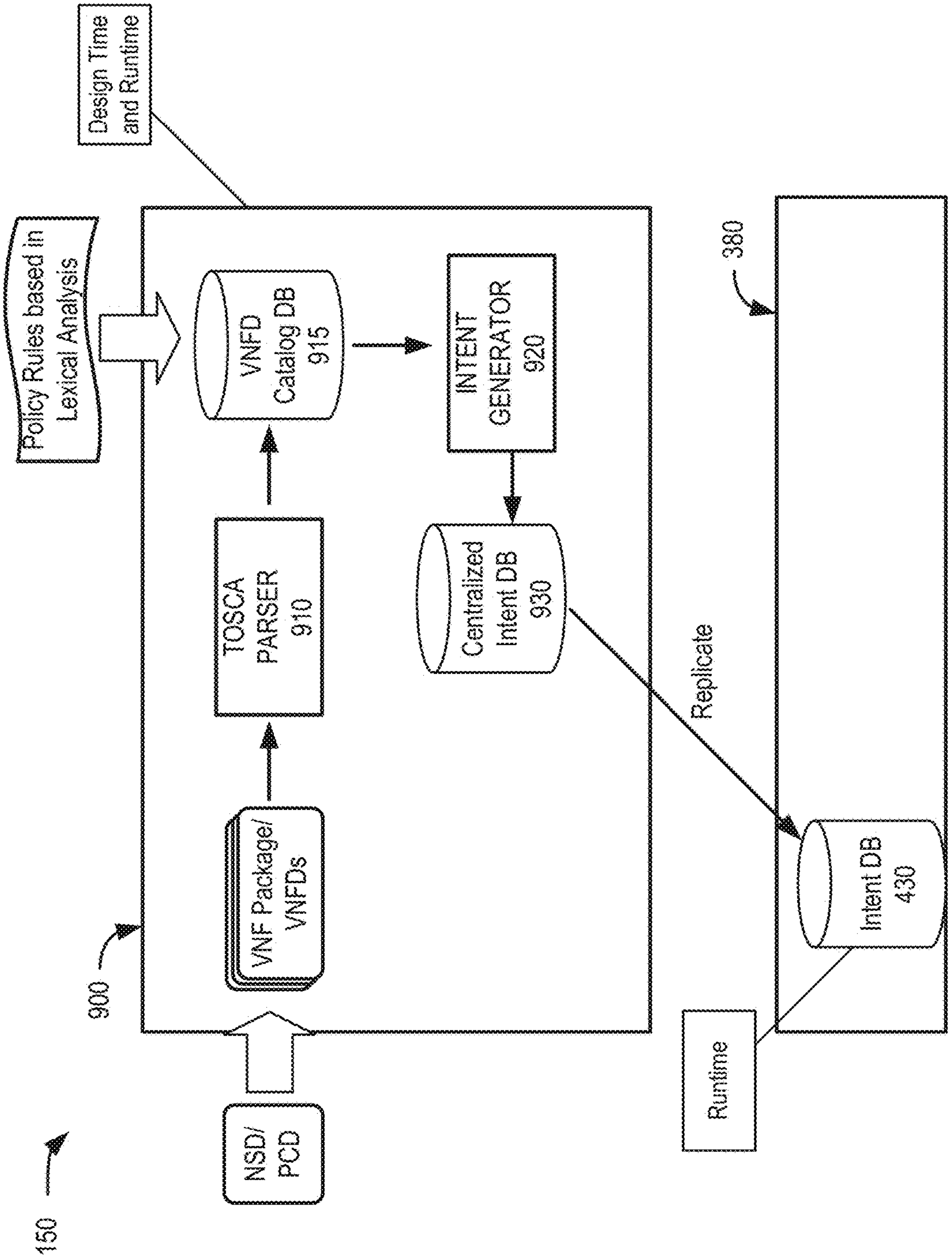
FIG. 9 is a diagram illustrating some aspects of the NFV deployment service, according to another implementation.

FIG. 9 is a diagram illustrating some aspects of a NFV deployment service 150 according to another implementation. As shown in FIG. 9, the NFV deployment service 150 may include MCCM 380 and a service orchestrator (SO) 900 (e.g., VNFO 350, SMO 602, etc.). Service orchestrator 900 may include a TOSCA parser 910, a VNFD catalog database 915, an intent generator 920, and a centralized intent database 930. Each of MCCM 380, service orchestrator 900, TOSCA parser 910, VNFD catalog database 915, intent generator 920, and centralized intent database 930 may be implemented as network functions on one or more devices 200.

Functions of SO 900 are described in connection with the process flow of FIG. 10. SO 900 may receive network service (NS) packages (block 1010). For example, as shown in FIG. 9, SO 900 may receive a network service package including NSDs and PCDs for a network service requested through an OSS/BSS (e.g., OSS/BSS 310). SO 900 may decompose the NS package to determine the composition of the network service (block 1020) and resolve the NS constituents into multiple VNFs and VNFCs (VNF containers) (block 1030). For example, SO 900 may generate a VNF package with VNFDs for each of the VNFs and VNFCs.

SO 900 may parse the VNF package and VNFD of the VNFs and the VNFCs (block 1040). SO 900 (e.g., TOSCA parser 910) may parse the VNFD and identify the TOSCA normative keywords (mapped to compute, storage, network resources) (block 1050). SO 900 may then catalog the design time topology into the VNFD catalog database (block 1060). For example, TOSCA parser 910 may publish the data in a VNFD catalog database 915. VNFD catalog database 915 may contain the metadata about the VNFs and VNFCs modelled in the TOSCA based VNF Descriptor. The metadata may include information about the latest VNF package and the historical records, and additionally the topological information of the VNF such as compute, storage, and network resources mapped to TOSCA node types. Additionally, the metadata may also include the placement policies, security policies, network policies mapped to corresponding VNFCs.

An intent generator of SO 900 may read the normative types from the catalog DB and deduce the intents, followed by entry of the intents into the intent database (block 1070). For example, intent generator(s) 920 in SO 900 may generate the intents/events based on the information stored in the VNFD catalog database 915. Generated events are stored as intent blocks in a centralized intent database 930.

Another source of information to populate the intent DB is the Configuration Information Questionnaire (CIQ) that is generated with the NS package. SO 900 may populate and/or supplement the intent database using information in the CIQ (block 1080). A CIQ typically lists possible NF or service attributes, which a vendor can select for setting on a per-site basis or a per-feature basis. The CIQ sheet contains the site-specific information (IP addresses, VLANs, etc.), which can be used to populate the centralized intent database 930.

The intent database at the SO is replicated/distributed to the intent database in MCCM 380 (block 1090). For example, centralized intent database 930 may be replicated to an MCCM 380 instance, as intent DB 430, in the cloud (e.g., a cloud platform that complies with O-RAN requirements to host O-CUs, O-DUs, etc.). Various replication techniques and/or protocols may be used. As an example, key-based incremental replication may be used to mirror intent data, where each of the deployment intents (FIG. 7) may be labelled as a key. The value of the keys may be obtained from VNFD 606 and persisted in VNFD catalog database 915. Once an upgrade VNF package is cataloged in catalog DB 915, the state of centralized intent DB 930 may be refreshed. A replication algorithm may reconcile the current state and desired state of the configuration. The incremental change between the previous copy of the record stored in the intent DB 930 is compared with the current copy (or new) of the record and the incremental changes may be pushed from SO 900 to an intent DB 430 of an MCCM 380 instance.

The MCCM may read the design time policies and convert the TOSCA data models into a deployment configuration (block 1095). For example, as described above in connection with FIGS. 4-6, at an MCCM 380 instance, the generated blocks of intent can be processed by specific sensors (e.g., in intent sensor service 620) that can send a trigger to the actuators (e.g., in intent actuator service 630) for the execution of the intent blocks. The TOSCA data models may be converted into vendor-specific data models, such as Kubernetes (k8s), Amazon web services (AWS), Nomad, Cloudify, IronWorker, Docker, Apache Mesos, Openshift Container Platform, or another container orchestration platform.

Figure 11:
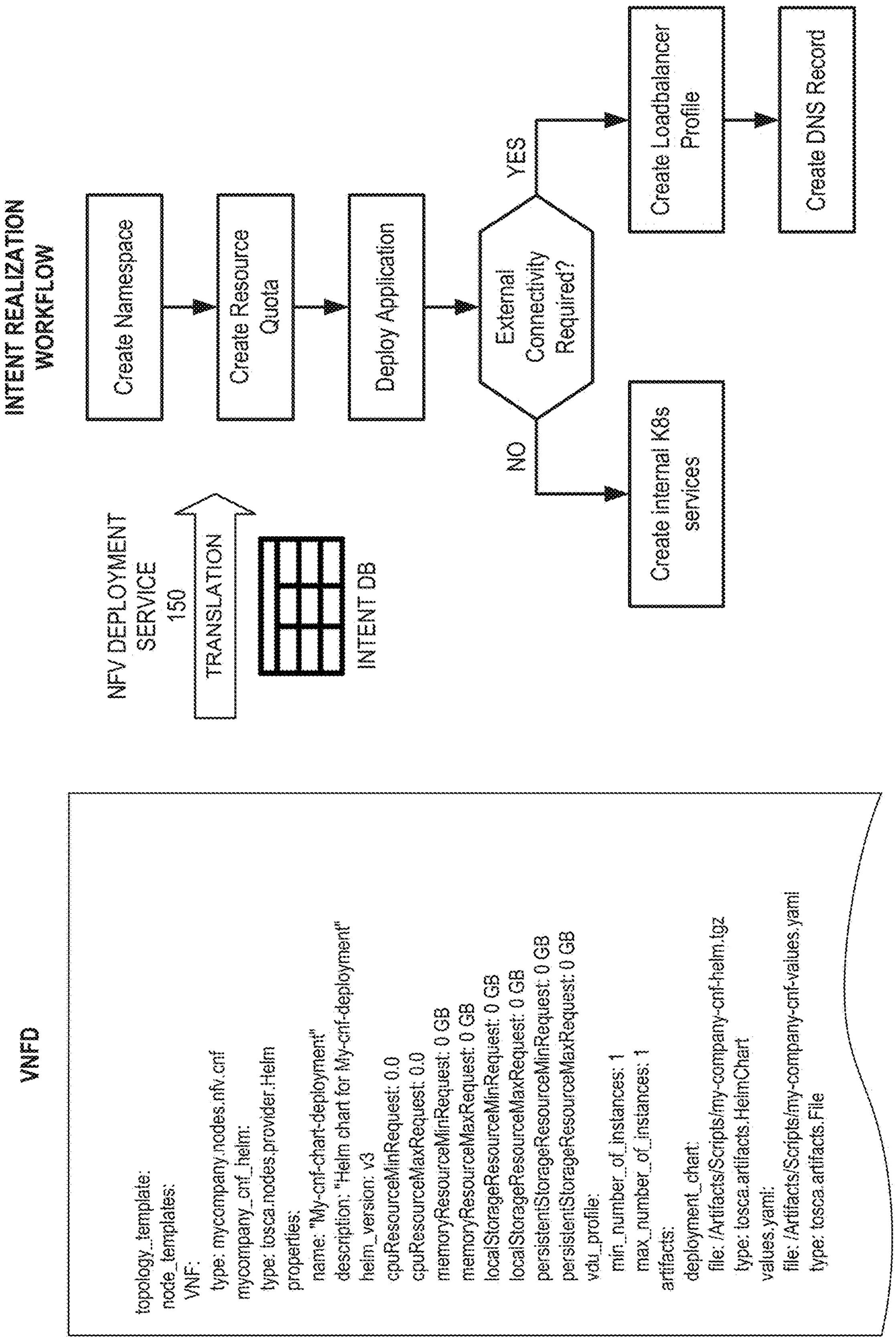
FIG. 11 is a diagram illustrating a use case for a containerized network function (CNF) deployment from a virtual network function descriptor (VNFD) to an intent, according to an implementation.

FIG. 11 is a schematic illustrating a CNF deployment from a VNFD to an intent. A VNFD may be generated by an SO (e.g., SO 900) based on a network service package. Using an intent database (e.g., intent database 430), MCCM 380 may translate the TOSCA-based VNFD to a vendor-specific model. Other use cases where the systems and methods describe herein may be applied include: generating application dimensions (creating quota/namespaces request/limits); provisioning network resources for ingress, egress and Domain Name servers (DNSs), Security Policies (SPK ingress/Transmission Control Protocol (TCP)/User Datagram Protocol (UDP), external Fully Qualified Domain Name (FQDN), CRs, etc., based on intents); support for legacy protocols, more network bandwidth, throughput; generic health check endpoints; and generic OAM functions (metrics).

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

Figure 10:
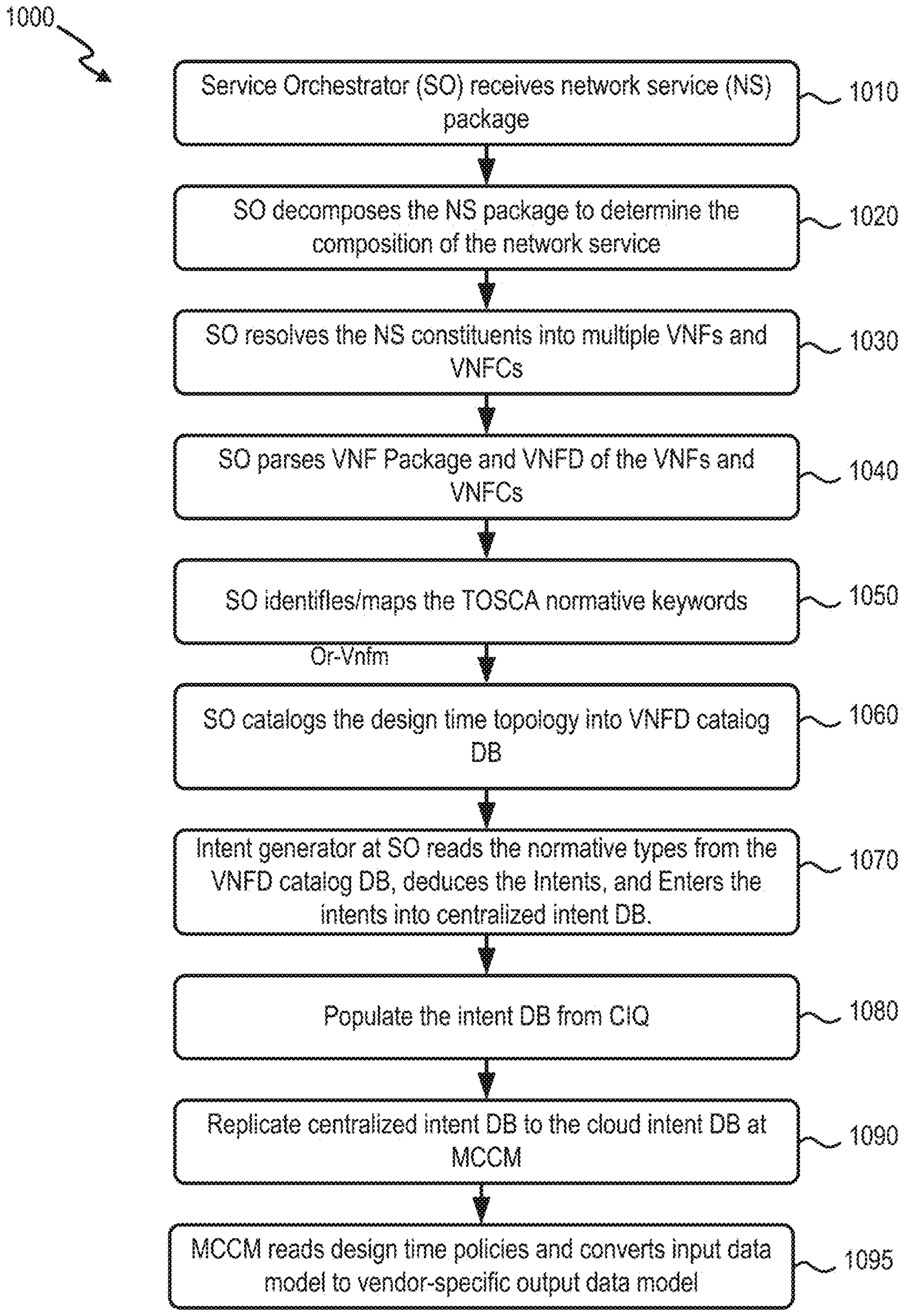
FIG. 10 is a flow diagram illustrating an exemplary process for providing intent-based orchestration with the NFV deployment service, according to an implementation.

In addition, while series of blocks have been described with regard to the processes illustrated in FIGS. 8 and 10, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 220, etc.), or a combination of hardware and software. The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor of a computational device. A non-transitory storage medium includes one or more of the storage mediums described in relation to memory.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A system comprising:

a first network device including one or more first processors to:

generate, based on stored virtual network function descriptors (VNFDs), intents for containerized network function (CNF) services, and store the intents, wherein the intents include an input data model for the CNF services; and a second network device including one or more second processors to:

read design time policies from a copy of the stored intents, and convert the input data model into a vendor-specific output data model in an output language.

2. The system of claim 1, wherein the input data model includes a network service descriptor (NSD) or a platform configuration descriptor (PCD).

3. The system of claim 1, wherein the vendor-specific output data model includes a custom resource definition (CRD) or a custom resource (CR).

4. The system of claim 1, wherein, when generating the intents, the one or more first processors are further to:

identify normative keywords in the stored VNFDs, deduce the intents, based on the identifying, and enter the intents into a database.

5. The system of claim 1, wherein the one or more second processors are further to:

provide an intent sensor service, wherein the intent sensor service includes an intent sensor to detect an intent type in the copy of the stored intents.

6. The system of claim 5, wherein the one or more second processors are further to:

provide an intent actuator service, wherein the intent actuator service includes an intent actuator for executing the intent type.

7. The system of claim 5, wherein the intent sensor service includes a different intent sensor for each intent type in the copy of the stored intents.

8. The system of claim 1, wherein the second network device is included within a network function virtualization management and orchestration (NFV-MANO) architectural framework.

9. The system of claim 1, wherein the first network device includes a VNF orchestrator (VNFO).

10. A method comprising:

generating, by a first network device and based on stored virtual network function descriptors (VNFDs), intents for containerized network function (CNF) services;

storing, by the first network device, the intents in a database, wherein the intents include an input data model for the CNF services;

reading, by a second network device, design time policies from a copy of the database; and converting, by the second network device, the input data model into a vendor-specific output data model in an output language.

11. The method of claim 10, further comprising:

detecting, by second network device, each intent type in the copy of the database.

12. The method of claim 11, further comprising:

generating, after the detecting, a custom resource definition (CRD) or a custom resource (CR).

13. The method of claim 10, wherein the input data model includes an application descriptor or a network service descriptor (NSD).

14. The method of claim 10, wherein the input data model includes a cloud deployment descriptor or a platform configuration descriptor (PCD).

15. The method of claim 10, wherein converting the input data model into the vendor-specific output data model includes:

generating a custom resource definition (CRD) or a custom resource (CR) in a language that is different than an input language of the input data model.

16. The method of claim 10, further comprising:

sending the vendor-specific output data model to a container infrastructure service manager (CISM) or a virtualization infrastructure manager (VIM).

17. A non-transitory, computer-readable storage medium storing instructions executable by a processor of a first network device, which when executed cause the first network device to:

receive, from a second network device, a database copy, wherein the database copy includes generated intents for an input data model in an input language;

read design time policies from the database copy; and convert the input data model into a vendor-specific output data model in an output language.

18. The non-transitory, computer-readable medium of claim 17, further storing instructions, which when executed cause the first network device to:

detect each intent type in the database copy.

19. The non-transitory, computer-readable storage medium of claim 17, wherein the instructions to convert the input data model, when executed further cause the network device to:

convert the input data model to a custom resource definition (CRD) or a custom resource (CR).

20. The non-transitory, computer-readable storage medium of claim 17, further storing instructions, which when executed cause the first network device to:

send the vendor-specific output data model to a container infrastructure service manager (CISM) or a virtualization infrastructure manager (VIM).

* * * * *